(No Model.) 8 Sheets—Sheet 4.

T. A. GALT.
COMBINED HAY RAKE, TEDDER, AND LOADER.

No. 424,415. Patented Mar. 25, 1890.

WITNESSES
Charles H. Roberts
Cyrus Kehr

INVENTOR
Thomas A. Galt
per Manahan & Ward
His Attys (No Model.) 8 Sheets—Sheet 5.

T. A. GALT.
COMBINED HAY RAKE, TEDDER, AND LOADER.

No. 424,415. Patented Mar. 25, 1890.

Fig. 10.

WITNESSES
Charles H. Roberts
Cyrus Kehr

INVENTOR
Thomas A. Galt,
per Manahan & Ward
His Att'ys (No Model.) 8 Sheets—Sheet 6.

T. A. GALT.
COMBINED HAY RAKE, TEDDER, AND LOADER.

No. 424,415. Patented Mar. 25, 1890.

WITNESSES
Charles H. Roberts
Cyrus Kehr

INVENTOR
Thomas A. Galt
per Manahan & Ward
His Attys (No Model.) 8 Sheets—Sheet 8.

T. A. GALT.
COMBINED HAY RAKE, TEDDER, AND LOADER.

No. 424,415. Patented Mar. 25, 1890.

ATTEST.
J. Henry Kaiser
Victor J. Evans

INVENTOR
Thomas A. Galt
per Manahan & Ward
His Attys.

UNITED STATES PATENT OFFICE.

THOMAS A. GALT, OF STERLING, ILLINOIS, ASSIGNOR OF ONE-HALF TO GEORGE S. TRACY, OF SAME PLACE.

COMBINED HAY RAKE, TEDDER, AND LOADER.

SPECIFICATION forming part of Letters Patent No. 424,415, dated March 25, 1890.

Application filed January 31, 1887. Serial No. 226,047. (No model.)

*To all whom it may concern:*

Be it known that I, THOMAS A. GALT, a citizen of the United States, residing at Sterling, in the county of Whiteside and State of Illinois, have invented certain new and useful Improvements in a Combined Hay Rake, Tedder, and Loader; and I do hereby declare the following to be a full, clear, and exact description of the invention, such as will enable others skilled in the art to which it appertains to make and use the same, reference being had to the accompanying drawings, and to letters and figures of reference marked thereon, which form a part of this specification.

My invention has reference to a combined hay rake, tedder, and loader, but pertains more especially, first, to certain improvements in the revolving rake hereinafter specified; second, to the mechanism for delivering the hay at the side of the rake and in a windrow parallel with the line of movement of said rake; third, to an attachable elevator for loading and improvements therein.

There have been two serious objections to all horse hay-rakes heretofore in use.

First, they universally gather the hay by dragging it over the surface of the ground. This not only packs the hay too tightly together, and thus renders it too compact for drying out in the windrows, but the same process which drags the hay together (particularly in the case of spring-teeth rakes) collects with the hay cornstalks, dead grass, loose sods, clods, and other débris, and also large quantities of dust are intermixed with the hay in the operation of gathering the latter. Thus the hay is rendered foul and dusty.

Second, as the mowing is done by passing around the outside of the grass to be cut it is practicable to rake only with the swaths. Therefore the windrows in the former method were formed at right angles with the swaths, which resulted in the windrows being short, thereby necessitating much turning and being particularly inconvenient for the use of a hay-loader, and, further, resulted in each windrow containing hay in various degrees of dryness, graduating from quite dry hay at the outer end of the windrows to quite green hay at the inner end thereof.

In my invention, whether used as a rake simply or as a tedder or as a loader, I obviate all of these difficulties. By my mode of transferring the hay to the side of the machine I am enabled to use a revolving rake-head, which takes up the hay as it lies in the swath without dragging it or pressing it together and without collecting with it dust or any débris. As the rake-teeth do not scratch over the surface of the ground, no dust is created therefrom.

In the use of my invention as a rake or tedder I deposit the hay in windrows parallel with the swaths, such windrows being exclusively of the same swaths. Thus the windrows are not only longer and convenient for loading, but, beginning with the outer hay or the hay first cut, each swath constitutes a separate windrow and enables me to begin raking as soon as the outer hay or the oldest swath is sufficiently dry, extending the process toward the standing grass as the hay shall dry and having the hay in each completed windrow of a uniform degree of dryness.

My machine is designed to be used under three conditions and for three purposes. First, if the swath is so heavy as to require teddering to facilitate the curing process merely the rake and side-delivery spout are used, the elevator-spout being removed. When the machine is thus prepared, the rake tears the half-cured grass apart and drops it into the side-delivery spout, and the latter deposits the hay in the loose or flocked condition in a windrow alongside of and parallel with the path of the machine. As above stated, the hay in this windrow is all from the same swath, or, at the most, two swaths, and of a uniform degree of dryness. The hay in its progress to the windrow is shaken apart and is dropped a short distance from the outlet of the side-delivery spout, and is deposited in the windrow in such a loose condition that the air and sun can readily pass through it and complete the progress of curing. When fully cured in such windrows, the hay can be loaded directly therefrom, or two or three windrows can be thrown together by passing the rake over them longitudinally, these aggregated windrows still retaining the characteristic uniformity of the hay therein and still extending in the line of the original swaths. In case the hay cures sufficiently in the original swaths and it is not desired to tedder it the machine is used as last described to gather the hay into larger windrows in the line of the swaths, throwing three or more swaths together. When it is desired to load the hay directly from the swath, the elevator-spout may be attached and the hay loaded directly on the wagon from the swath.

For the rake portion of the machine I use the analogous part of the hay-loader patented by James W. Foust in United States Letters Patent No. 329,383, dated October 27, 1885, with certain improvements thereon hereinafter named; and as the construction of this part of the machine is fully shown in such patent, I do not deem it necessary to repeat it here further than to make plain my improvements thereon.

My machine consists of three material parts.

The first of which consists substantially of the Foust rake referred to and its elevator, the lower end of which latter is carried on the transverse rake bars or head, and has thereby imparted to it its movement. In this description this elevator will need no special reference, as it will be treated as a part of the rake.

The second material department of this invention is the side-delivery spout, placed transversely of the machine in front of and slightly under the upper end of the rake-elevator, and which receives the hay from the rake and deposits it at the side of the machine. One very special advantage in the use of the side-delivery spout is that it permits the rake-head to pick the hay from the ground, instead of dragging it together.

The third department of my invention is a detachable and hinged elevator-spout intended to be used in those cases in which the hay is sufficiently dry in the swaths to be in a condition for hauling to the barn or stack.

Figure 1:
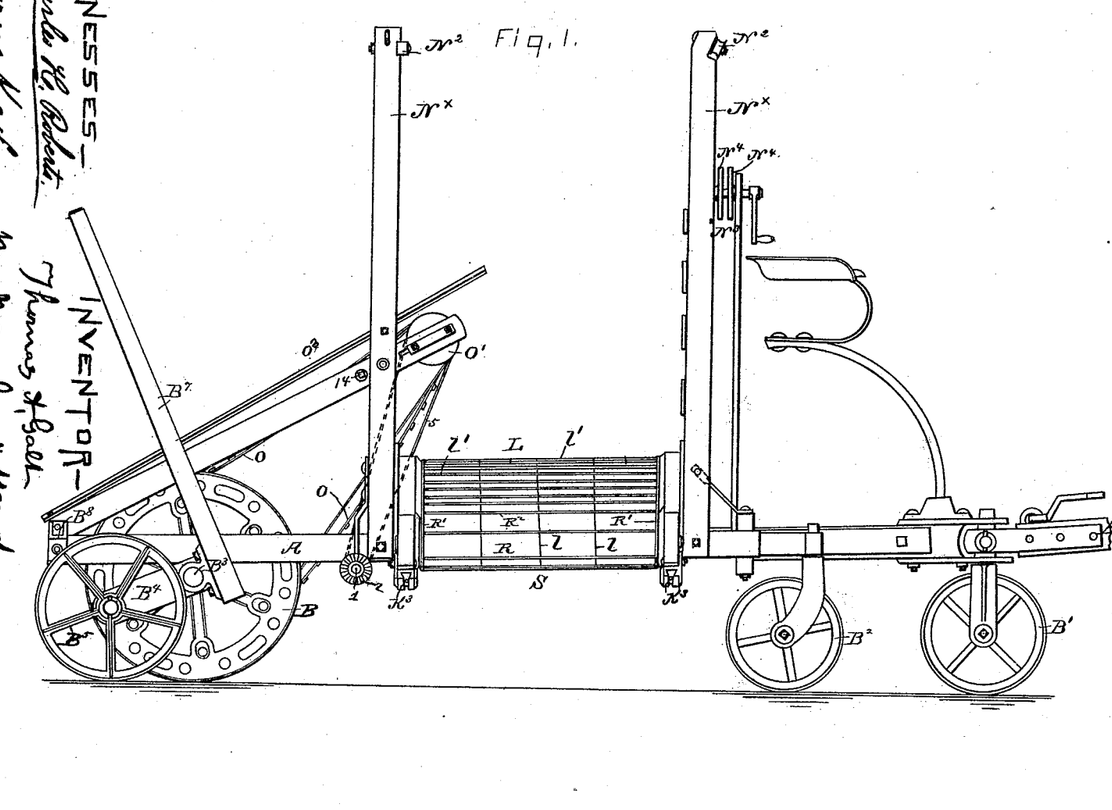
Figure 1 is a side elevation of the rake or tedder.

Referring to Fig. 1, A is the frame of the machine, which is provided in the usual way with the tongue $A'$, by which it can be moved when desired. This frame is supported at its rear end when in operation on the rotary rake B and at its forward end, as is usual in machines of this general description, on a central guide-wheel $B'$, which is pivotally seated at the rear end of the tongue and adapted to be twisted by the latter to give direction to the machine. As the weight of the elevator-spout when attached tends to throw the gravity of the machine to that side, I find it useful to add in the rear of the caster-wheel $B'$ a second wheel $B^2$ under the machine and directly in front of the junction of the heel of the elevator with the lower end of the side-delivery spout, as shown in Fig. 1.

Figure 11:
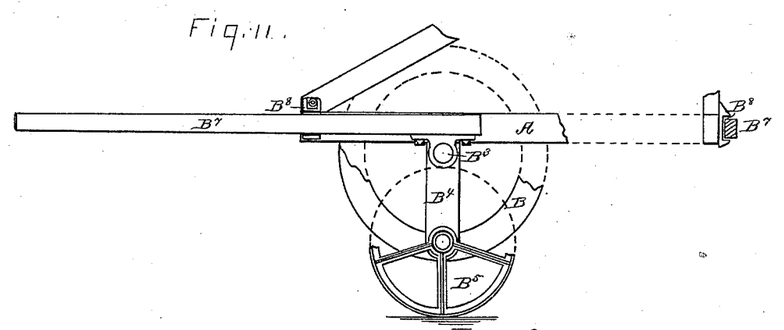
Fig. 11 shows details of the modes employed to raise the rake-head from the ground for convenience in transportation.

For convenience in transporting the machine I pivot on each end of the axle $B^3$ a short arm $B^4$, and on the lower end of the latter is seated a wheel $B^5$. To the upper end of the arm $B^4$ is attached at right angles therewith a lever $B^7$. The arm $B^4$, together with the radius of the wheel $B^5$, is slightly longer than the radius of the rake-head B. Therefore when the lever $B^7$ is drawn backward, so as to bring the arm $B^4$ in a vertical position, the rear of the machine is raised sufficiently to suspend the rake B clear of the ground. A lug $B^8$ is attached to the rear corners of the machine, and when the lever $B^7$ is drawn to a horizontal position it is sprung under said lug, and thereby retained.

Referring to Figs. 3, 4, 5, and 6, the improvements further consist in the anchor-shaped stops C, which are placed on the rake-bars $C'$, and on different ends of the latter, projecting therefrom in a direction opposite to the teeth, and so arranged and adapted that at all times certain of the stops C are projected through the rake-elevator behind the cross-slats $C^2$ of the latter, and prevent the slipping of the elevator-slats and compel them to keep their position relative to the rake-bars $C'$. Heretofore in certain movements of the rake, particularly in backing, the elevator would slip on the rake-bars and not be carried back with said bars, the result frequently being that the slats $C^2$ were left in position to interfere with the action of the rake-teeth.

Figure 3:
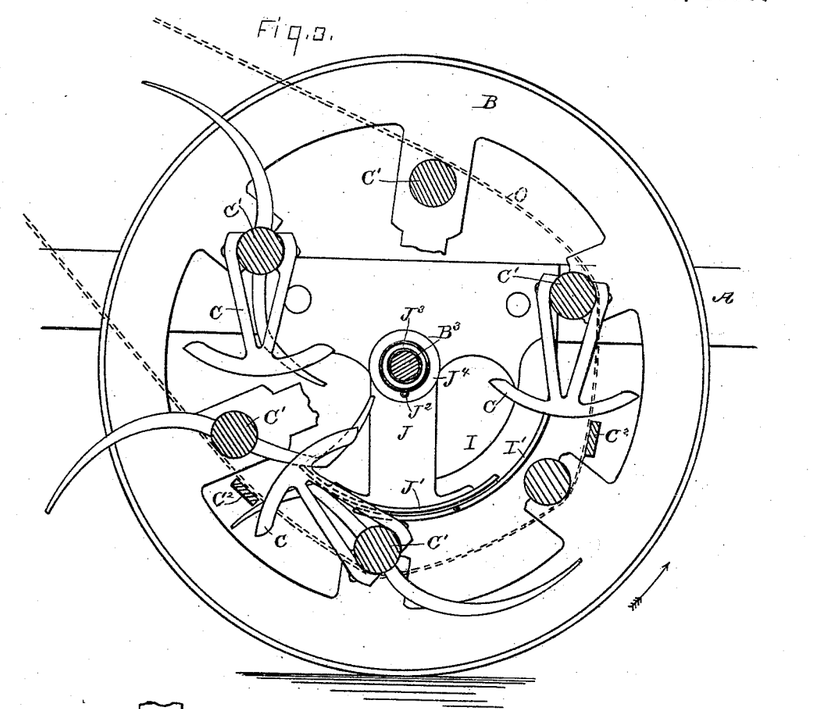
Fig. 3 is an end view of the rake-head and adjacent parts, showing the means for preventing the retrogression of the elevator-strips and for preventing the locking of the rake-bars hereinafter mentioned.

In practical operation I have found that the above method of continuously fixing the position of the slats $C^2$ relative to the rake-bars $C'$ obviates the former difficulty experienced by allowing the elevator to slip casually on such bars.

Figure 4:
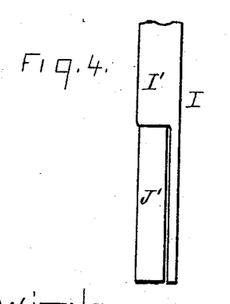
Fig. 4, a detail in plan showing cam I and its flanged edge and the segmental face of the arm J.
Figure 5:
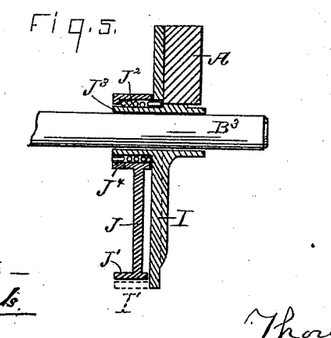
Fig. 5 is a sectional view of the device for intercepting the strips of the elevator.
Figure 6:
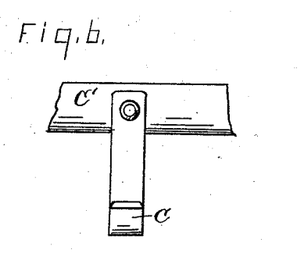
Fig. 6 is a front elevation of one of the anchor-stops.

Heretofore in some machines of this general description the cam which engaged the pendants projecting from the rake-teeth, and thus directed the teeth so as to pick up the hay, were rigid at the front end; but this structure did not allow sufficient room under the cam for the proper swing of the teeth. To obviate this difficulty I have shortened the cam I and have placed above it the arm J, collared loosely at its upper end on the sleeve $J^3$, by which the cam I is supported on the axle $B^3$ of the rake, said arm J being furnished at its lower end with the segmental face $J'$, which conforms to the upper surface of the flange edge $I'$ of the cam I and projects in front of the forward end thereof. The coiled spring $J^2$, Fig. 5, is suitably seated between the collar $J^3$, encircling axle $B^3$ and the circular head $J^4$ of the arm J, so as to allow the front end of the segmental portion of the arm to project beyond the front end of the cam I. One end of the spring $J^2$ is fastened in the collar $J^3$, and the other end of said spring is fastened in the oscillating head $J^4$ of the arm J. The pendants of the rake-bars $C'$ engage the front end of the segment $J'$ of arm J in the same manner that the former engages the front end of the fixed cam I; but the spring $J^2$ holds the segment $J'$ to the front adjustably, so that if a more than ordinary pressure is exerted against the end of said segment the spring $J^2$ will yield and allow said segment to swing to the rear, thus allowing the room for the rake-bars $C'$ to make their necessary change of position.

Figure 2:
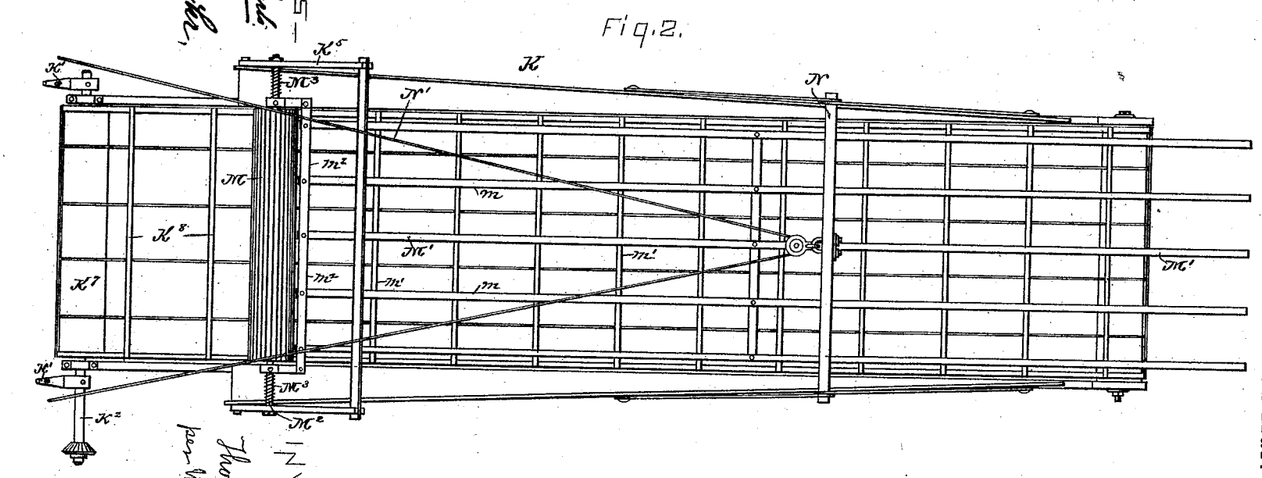
Fig. 2 is a plan or top view of the elevator-spout and its appurtenances.
Figures 7, 8, 9:
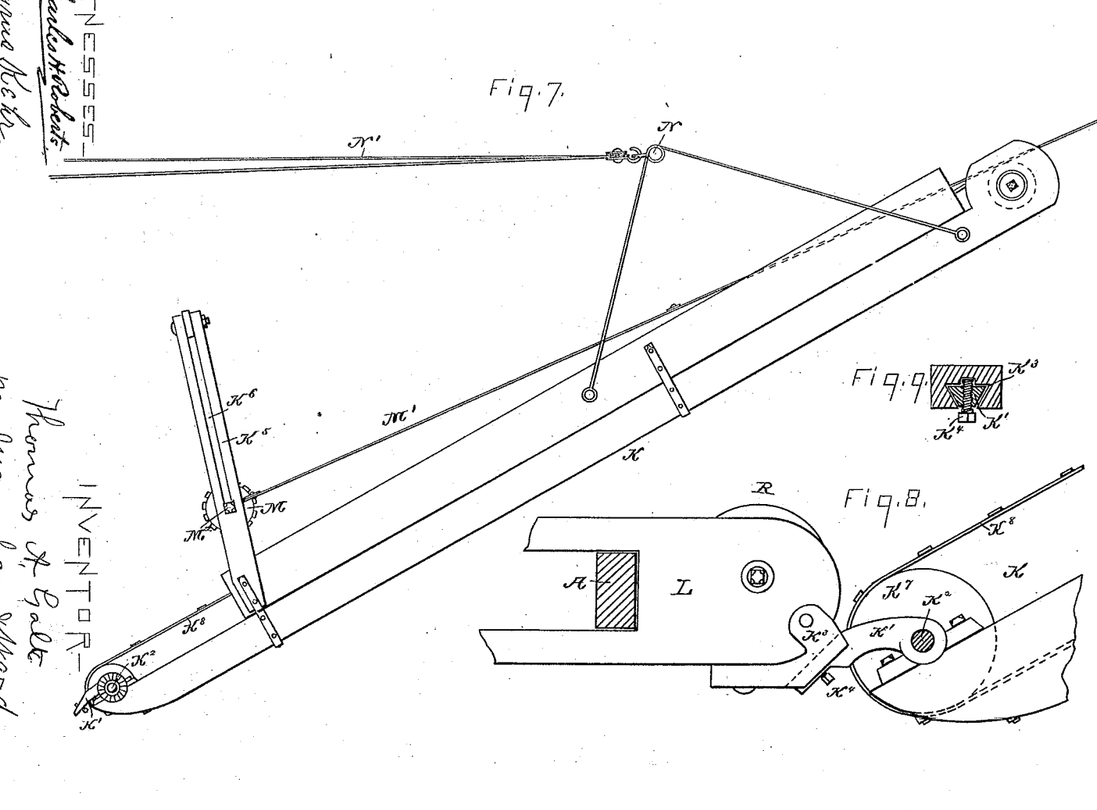
Fig. 7 is a side elevation of the elevator-spout.
Fig. 8 is a partial side elevation of the junction of the elevator-spout and the outer end of the side-delivery spout.
Fig. 9 is a detailed cross-section of the seating of the elevator-foot in the dovetailed slot in the shoe attached to the outer end of the side-delivery spout.
Figure 10:
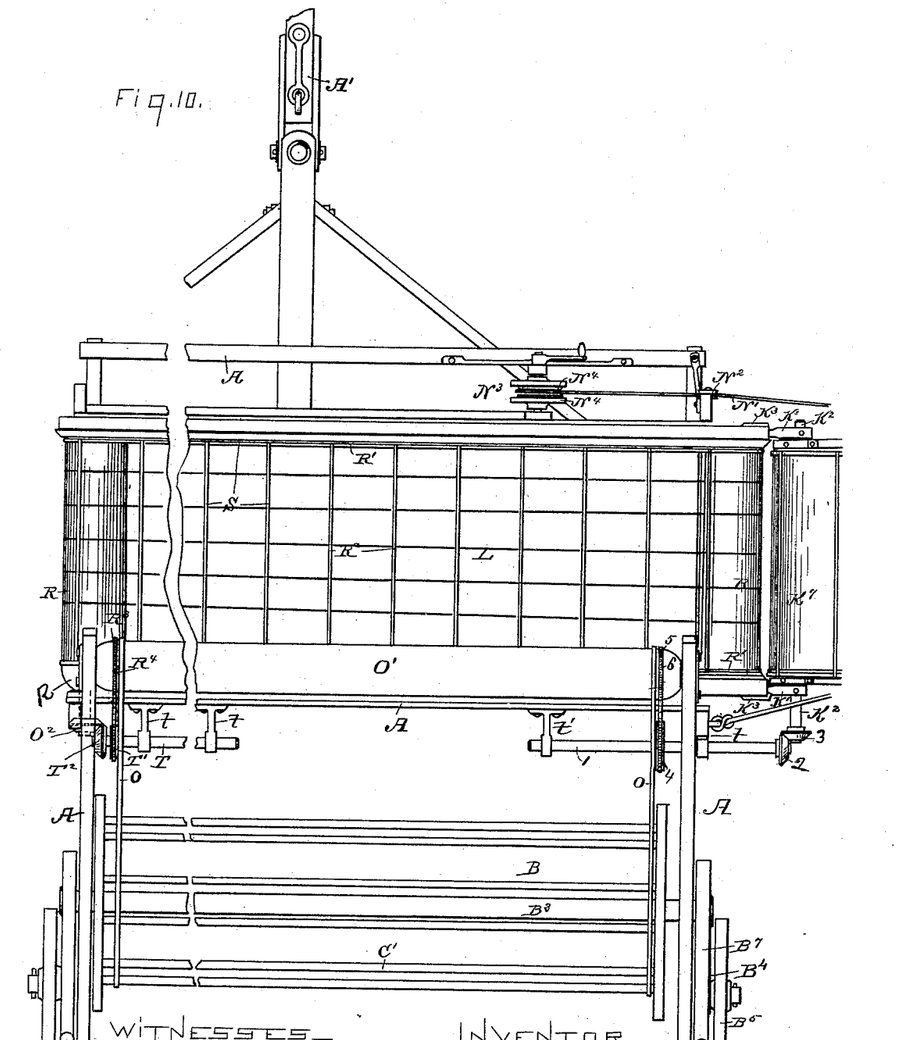
Fig. 10 is a partial plan of the rake and side-delivery spout.

Referring to Fig. 2, K is a detachable elevator carried on the heel of the side-delivery spout L and seated therein by means of short legs $K'$, sleeved loosely at their upper ends on shaft $K^2$ of the lower roller of said elevator and dovetailed into conforming grooves $K^3$ in the lower corner of the sides of the delivery-spout L, (see Figs. 8 and 9,) and suitably held therein by the screw $K^4$. On the elevator K, and near the lower end thereof, are placed vertical posts $K^5$, provided with longitudinal slots $K^6$ therein. In the slots $K^6$ is loosely journaled a corrugated roller M, which is perfectly automatic in its movements and rotated alone by the passage of the hay under it. The endless apron or belt in spout L is made of longitudinal ropes or wires $e$, to which are fixed the slats $e'$ at right angles.

The advantage of the roller M is that it presents a yielding or movable surface to the upper side of the hay, and the pressure of the latter against such roller causes the lower side thereof to move upward with the apron $K^8$ of the elevator, the hay passing under the roller and rotating the latter in such passage.

By means of slots $K^6$ the roller M is free to adjust itself vertically in proportion to the amount of hay passing thereunder, and all lodging of the hay at the point where the latter is carried by the elevator-apron under the wind-break $M'$ is obviated.

The wind-break $M'$ is composed of parallel slats $m$, connected at suitable intervals by cross-pieces $m'$. At its lower end the longitudinal slats are secured to the yoke $m^2$, which is journaled on the shaft $M^2$ of the roller M, and by this construction the wind-break is carried up and down with the varying altitude of said roller. The lower end of the wind-break $M'$ is held adjustably on the shaft $M^2$ by means of coiled springs $M^3$, interposed on said shaft between said wind-break and the outer ends of said shaft. The uprights $N^x$ on each side of the spout are provided at their upper ends with pulleys $N^2$. These uprights are for the purpose of sustaining the elevator K. The altitude of the elevator is regulated by means of the rope $N'$, which is fastened at one end to the machine, and thence passing over one of the pulleys $N^2$, and then through the yoke N back to the elevator and over the pulley $N^2$ to the winding-drum $N^3$.

The drum $N^3$ is provided with two circular plates $N^4$, between which the rope $N'$ is coiled, and said drum is held in any desired position by the usual pawl and ratchet.

O is the elevating-apron, which is carried upon and driven by the rotary rake B and suspended at its upper end on the roller $O'$. The usual slats $O^3$ above the apron will prevent the hay from being dislodged in its progress from the rake to the spout. This apron is made, similarly to that in the spout L, of longitudinal strips and cross-pieces fixed at right angles and at each end thereto.

L is the side-delivery spout, seated transversely of the machine under and in such position as to receive the hay from the apron O. At each end of the spout L are journaled rollers R, which carry the belts $R'$ and cross-slats $R^2$, which constitute the discharging-apron S of the spout L. The apron S is driven by means of a short shaft T, journaled parallel therewith on the frame A in the brackets $t$, attached to and extending from said frame, and said shaft is provided at its opposite end with sprocket-wheel $T'$. Rotation is communicated to the shaft T by means of a sprocket-wheel $R^3$, attached to the adjacent end of the upper roller $O'$, and the sprocket-chain $R^4$, carried on the sprocket-wheels $T'$ and $R^3$. On the outer end of the shaft T is seated the bevel-gear $T^2$, which engages and actuates the corresponding gear $O^2$ on the upper roller R of the spout L.

The elevator K is driven by means of the short shaft 1, seated in bearings $t'$, attached to and extending from the frame A parallel with the spout L, and provided at its outer end with bevel-gear 2, which engages and actuates the corresponding bevel-gear 3 on the shaft $K^2$ of the lower roller $K^7$ of the elevator K. The shaft 1 is rotated by means of a sprocket-wheel 4, seated about midway of said shaft and driven by a sprocket-chain 5 from a sprocket-wheel 6, seated on the adjacent end of the roller O'.

Figures 12, 13, 14:
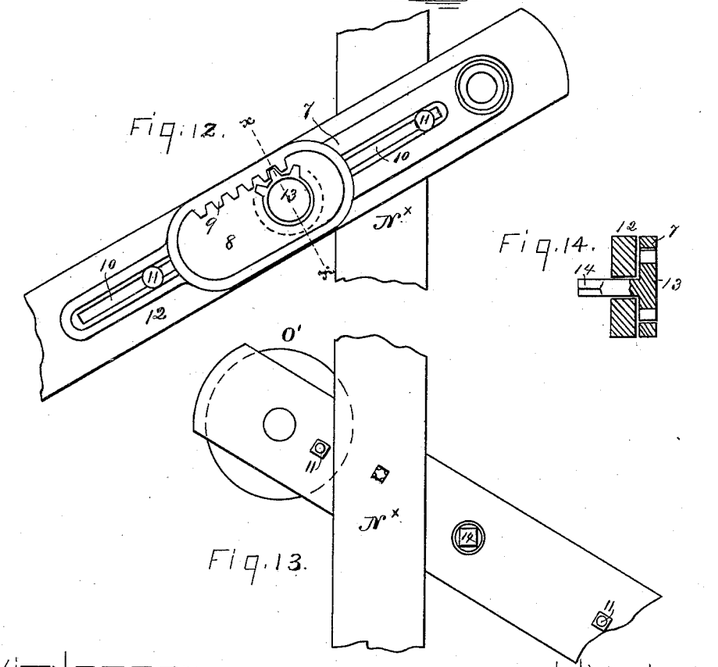
Figs. 12, 13, and 14 exhibit the device for securing the tension of the carrier which passes around the rake.
Figure 15:
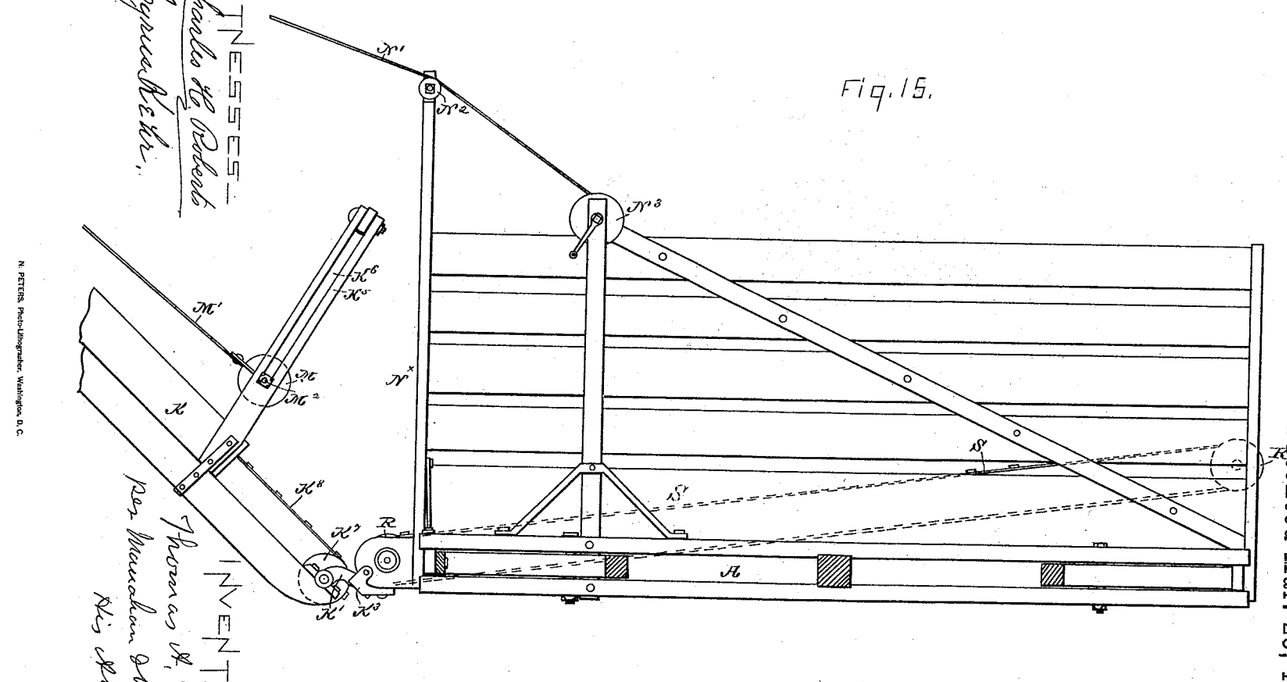
Fig. 15 is a cross-section of the front side of the side-delivery spout, together with the lower end of the elevator-spout.
Figure 16:
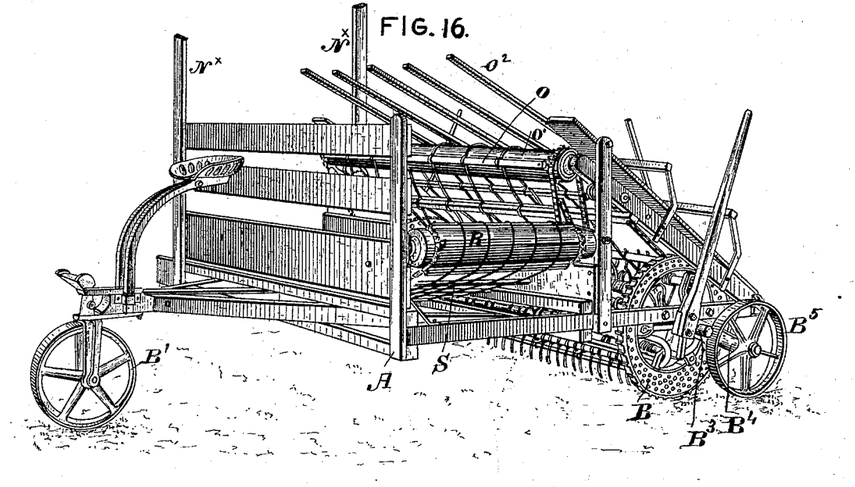
Fig. 16 is a perspective view taken from the forward part of the machine, (the elevator not being shown;) and Fig. 17, a like view taken from the rear part.
Figure 17:
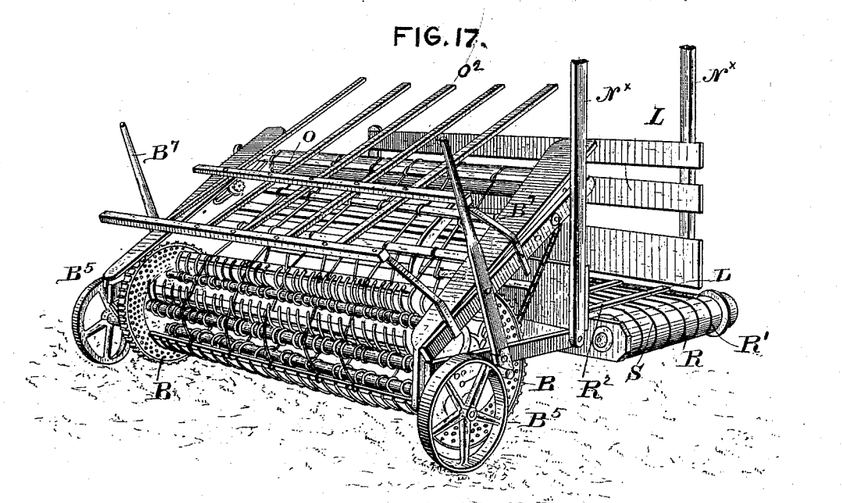

Figs. 12, 13, and 14 exhibit mechanism for tightening the elevator-apron O, which is carried on and driven by the rotary rake B, and consists of a casting 7, in which the upper roller O' of said apron is journaled. This casting 7 is provided with the elongated opening 8, on one side of which is formed the rack 9. In the casting 7 is also formed longitudinal slots 10, through which bolts 11 hold said casting against the usual side plate 12 of the elevator. A short roller 13, having a partial gear to engage the rack 9 and provided with an exterior square head 14, is seated through the opening 8 in the side plate 12, and by placing a wrench on the head 14 the casting 7 can be forced up or down the plate 12, and when the right tension of the apron O has been obtained the casting 7 is held in position by tightening the bolts 11.

What I claim as my invention, and desire to secure by Letters Patent of the United States, is—

1. The combination of the rotary rake B, the elevator-apron O, driven by said rake and upon which said rake delivers the hay, a receptacle at the end of said apron, and a side-discharge apron S at the bottom of the receptacle and located near the ground and driven from upper roller of the elevator, substantially as and for the purposes set forth.

2. The combination of the elevator K, having short legs K', and the shaft $K^2$ of the lower roller, on which shaft said legs are sleeved loosely at the upper ends, with the side-delivery spout L, having in its lower corners the dovetailed grooves $K^3$, whereby said elevator can be readily attached to or separated from said side-delivery spout, substantially as described.

3. In combination with the cam I, suitably attached to the frame A, oscillating arm J, provided with segmental end J' and having its front end extended beyond that of the cam I, and the spring $J^2$, whereby said arm J is yieldingly held in its working position, substantially as shown, and for the purpose described.

4. The combination, with the elevator-apron O, of the rake B, and the rake-bars C', provided with the stop C, adapted to engage the slots $C^2$ to compel retrogression of the latter coincidently with said rake-bars, substantially as shown.

5. The elevator K, having near its lower end the longitudinally-slotted vertical posts $K^5$, the corrugated roller M, loosely journaled in the slots of said posts, and the wind-break M', journaled by its yoke $m^2$ on the shaft $M^2$ of said roller and held yieldingly on the shaft by the springs $M^3$, interposed on said shaft between its outer ends and said wind-break, substantially as described.

6. The corrugated roller M, journaled loosely in the slotted posts $K^5$ by means of its shaft $M^2$, combined with the yoke $m^2$, the wind-break M', journaled at its lower end on said shaft, and the elevator K, carried on the heel of the side-delivery spout L, and the said spout, substantially as described.

In testimony whereof I affix my signature in presence of two witnesses.

THOMAS A. GALT.

Witnesses:
  CYRUS KEHR,
  CHARLES H. ROBERTS.